Aug. 30, 1966

N. B. HANSON 3,269,780

ENSILAGE DISTRIBUTOR

Original Filed Oct. 24, 1963

INVENTOR.
NEWELL B. HANSON
BY
Merchant, Merchant & Gould
ATTORNEYS

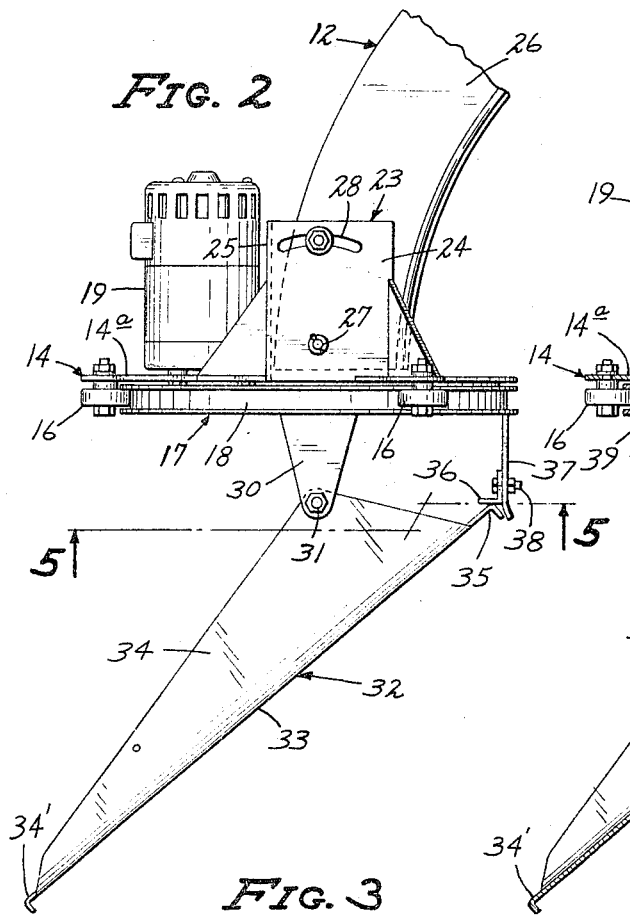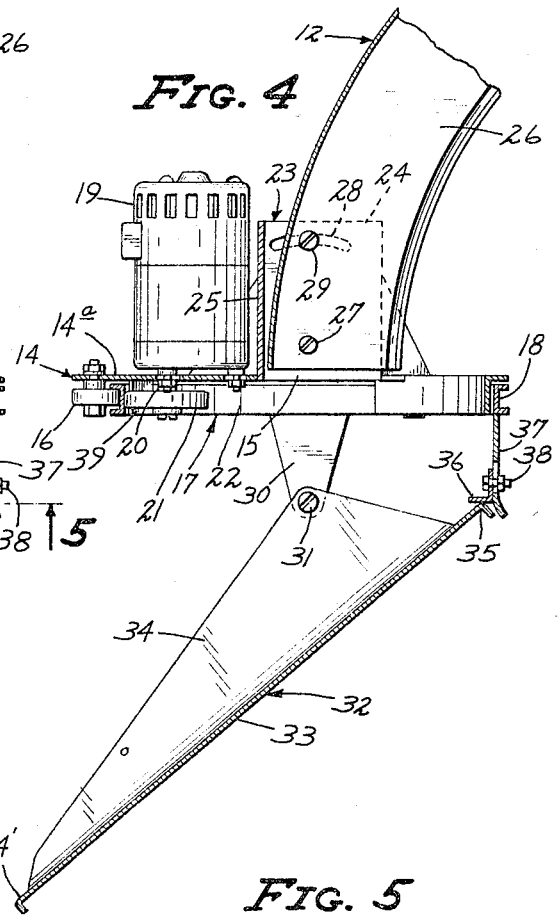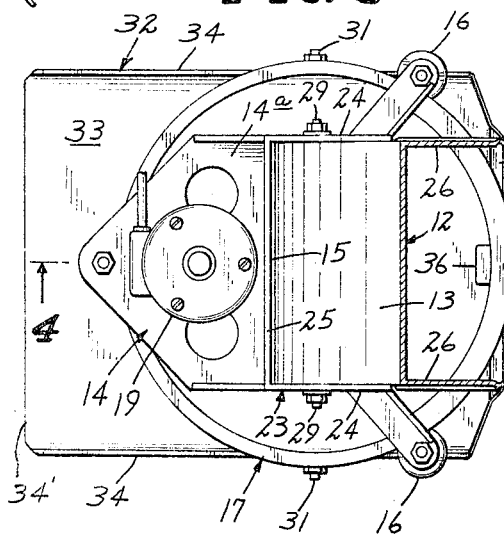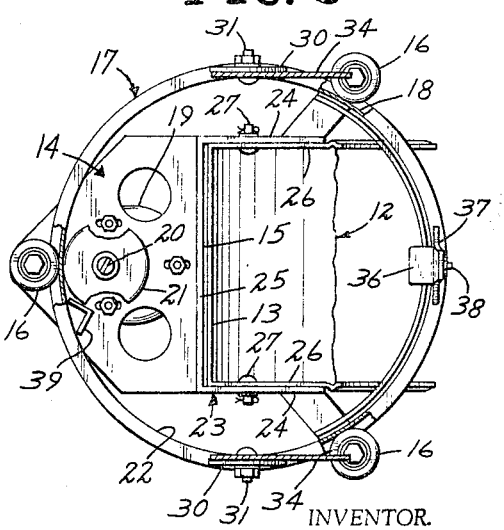

United States Patent Office 3,269,780
Patented August 30, 1966

1

3,269,780
ENSILAGE DISTRIBUTOR
Newell B. Hanson, Lake Lillian, Minn., assignor to Hanson Silo Company, Lake Lillian, Minn., a corporation of Minnesota
Continuation of application Ser. No. 318,634, Oct. 24, 1963. This application Mar. 8, 1965, Ser. No. 446,451
5 Claims. (Cl. 302—60)

The present application is a continuation of application Serial No. 318,634, filed October 24, 1963, now abandoned, and entitled, Ensilage Distributor.

My invention relates generally to devices for evenly distributing ensilage, grain, or other particulate material as it is being delivered into a silo or bin for storage.

It is a relatively simple matter to evenly distribute ensilage or other particulate matter under conditions wherein the delivery chute terminates approximately at the axis of the silo or other storage bin. However, a great number of modern silos are equipped with power unloaders of the type which are raised and lowered from operative to inoperative positions by means of an axially disposed suspension cable. Under such conditions, it is obviously necessary to terminate the delivery chute associated with the blower in a position offset from the axis of the silo.

The primary object of my invention is the provision of a rotary distributor for ensilage or other particulate matter which, by means of a few simple adjustments, may be made to compensate for any usch off-center relationship of the delivery chute whereby to assure an even distribution of ensilage or other particulate matter throughout 360 degrees of rotation.

A further object of my invention is the provision of a device of the class above described which is more efficient in its operation than any device of this character heretofore produced, which incorporates but a minimum of working parts, and which is extremely easy to install and remove from operative position within a silo.

A still further object of my invention is the provision of a device of the class above described which is relatively inexpensive to produce, which is light in weight, and which may be folded into compact form for storage, shipment, or insertion through relatively small openings.

The above and still further objects of my invention will become apparent from the following detailed specification, appended claims, and attached drawings.

Referring to the drawings wherein like characters indicate like parts throughout the several views:

FIG. 2 is an enlarged view in side elevation of my novel ensilage distributor shown in FIG. 1, portions thereof broken away;

FIG. 3 is an enlarged view in horizontal section as seen from the line 3—3 of FIG. 1;

FIG. 4 is a view in vertical section as seen from the line 4—4 of FIG. 3;

FIG. 5 is a view in horizontal section as seen from the line 5—5 of FIG. 2, portions thereof broken away and shown in section.

Figure 1:
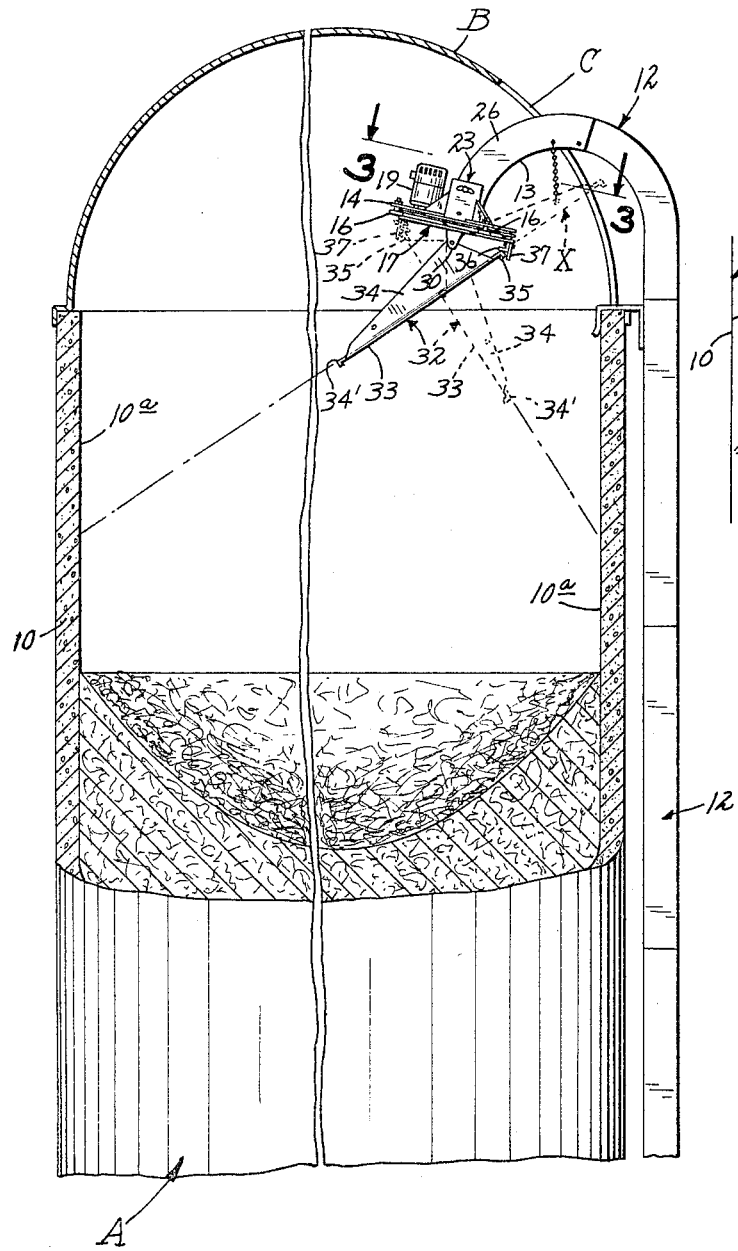
FIG. 1 is a view in elevation of a conventional silo, illustrating my novel device in operative position mounted on an ensilage chute therein, some parts being broken away, and some parts shown in section.

Referring with greater particularlity to the drawings, the letter A identifies a conventional silo having a cylindrical wall 10, the inner surface of which is identified by 10a. The dome-like roof on the silo A is identified by

2

B, the rectangular opening in one side therof being identified by C. Associated with an ensilage chopper-blower, not shown, but conventionally positioned exteriorly of the silo A below the opening C therein, is an upstanding ensilage conduit, the upper end of which is formed to define an arcuate delivery chute 12 which projects radially inwardly through the opening C in the roof B and terminates in radially offset relation to the axial cenetr of the cylindrical wall 10 in a generally downwardly directed center end 13.

My invention comprises a plate-like mounting member 14, defining a central opening 15. A plurality of circumferentially spaced roller elements 16 are rotatably carried by the plate 14 for rotation in a common plane underlying same and in spaced relationship thereto. An annular mounting ring 17 is formed to define a circumferentially extended substantially unbroken radially outwardly opening guide-channel 18 in which said roller elements 16 are received, whereby to freely mount said ring 17 for relative rotation with respect to said plate 14.

For the purpose of imparting rotation to said ring 17, as desired, I mount an electric motor-driven reduction unit 19 on the upper surface 14a of the plate 14 radially outwardly of the central opening 15 therein. Unit 19 terminates in a power output shaft 20 having a drive roller 21 fast on its outer end and in frictional engagement with the inside peripheral surface 22 of the ring 17. For the purpose of securing the plate 14 and parts carried thereby to the delivery end 13 of the ensilage chute 12, plate 14 is provided with upstanding bracket means 23, which, as shown, includes a pair of laterally spaced mounting flanges 24 and a connecting wall 25. Flanges 24 are spaced apart sufficiently to snugly receive therebetween the opposite side walls 26 of the ensilage chute 12. Pivotally securing said mounting plate 14 and parts carried thereby on a horizontal axis normal to a vertical plane drawn through the longitudinal axis of the chute 12 are a pair of aligned pivot pins 27. The extent of pivotal rocking movements of the plates 14 and ring 17 carried thereby is determined by aligned segmental slots 28 in the flanges 24 through which aligned cooperating nut-equipped stop pins 29 one each carried by one of the walls 26 of the chute 12 project.

Carried by the ring 17 at diametrically spaced points thereon and depending therefrom are a pair of anchoring ears 30. Pivotally secured to the lower ends of the ears 30 on nut-equipped pins 31 is a distributor spout 32. Spout 32 comprises a bottom 33 and laterally spaced upstanding side portions 34; with pivot pins 31 projecting one each through one of said side portions 34, at points offset from the longitudinal center of said spout 32 in a direction away from the delivery end 34a thereof. This arrangement, of course, permits the delivery end 34a of the spout 32 to assume the operative position shown in FIGS. 1, 2, and 4 under the action of gravity wherein the lip-equipped upper end portion 35 comes into engagement with an adjustable stop 36 carried by a depending anchoring lug 37 depending from the ring 17.

Figure 6:
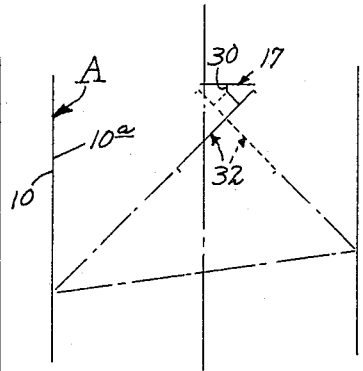
FIG. 6 is a diagrammatic view of an undesirable distribution pattern brought about by off-center relationship within a silo of the ensilage chute and parts carried thereby.

When it is desired to install my novel ensilage distributor to the delivery end 13 of a delivery chute 12, the distributor spout 32 may be moved from its operative to its inoperative position, shown by dotted lines in FIG. 1 as indicated at X, in order to insert same through a relatively small opening C in the top B of a silo A, if such is required. After installation, under conditions where, for one reason or another, the delivery end 13 of the delivery chute 12 terminates in an off-center relationship with respect to the cylindrical wall 10 of the silo A, adjustment of the plate 14 and ring 17 carried thereby about the axis of the pins 27 may be had in order to cause impingement of ensilage being delivered from spout 32 with wall 10 at substantially the same height throughout the 360 degrees of travel thereof, as indicated in FIG. 1. Attention is here directed to FIG. 6, wherein the broken lines indicate an uneven distribution of silage or the like, due to such off-center relationship and before imparting adjustments to the plate 14 and parts carried thereby to overcome this condition. On the other hand, if it is found necessary or desirable to raise or lower this impingement level, this may be accomplished merely by raising or lowering the stop element 37 by imparting adjustment to the nut-equipped bolt 38 associated therewith.

In the event that there is a tendency toward foreign matter accumulating on the inside peripheral surface 22 of the ring 17, so as to impair the driving engagement of drive roller 21 therewith, this is prevented through the medium of a scraper element 39 carried by the plate 14 and depending therefrom in close proximity to said surface 22.

My invention has been thoroughly tested and found to be entirely satisfactory for the accomplishment of the above objects; and while I have disclosed a preferred embodiment thereof, my invention may be capable of modification without departure from the scope and spirit of the appended claims.

What is claimed is:

1. In a device of the class described,
   (a) a generally horizontally disposed mounting plate defining a central opening,
   (b) a plurality of circumferentially spaced roller elements carried by said plate for rotation in a common plane underlying same and parallel thereto,
   (c) an annular mounting ring formed to define a circumferentially extended substantially unbroken radially outwardly opening guide-channel receiving said roller elements for rotation of said ring with respect to said plate,
   (d) a motor-driven gear reduction unit carried by said plate in radially spaced relation to said central opening and terminating in a roller-equipped power output shaft in driving engagement with said ring,
   (e) upstanding bracket means carried by said plate for securing same to the delivery end of an arcuate downwardly directed silage delivery chute with said delivery end in alignment with said central opening, and
   (f) a normally downwardly and radially outwardly projecting distributor spout carried by said ring in underlying relation to said central opening in said plate.

2. The structure defined in claim 1 in which said bracket means carried by said plate is adapted to secure said plate and the parts carried thereby to said delivery end of said chute for rocking adjustments about a horizontal axis normal to a vertical plane drawn through the longitudinal axis of said chute.

3. The structure defined in claim 2 in which said distributor spout is secured to said ring for limited pivotal swinging movements on a horizontal axis underlying and parallel to said first mentioned pivot axis from said normal operative position wherein it projects downwardly and radially outwardly from said ring to an inoperative position wherein it is substantially parallel to said ring.

4. The structure defined in claim 3 in which the pivotal connection of said spout to said ring is offset from the longitudinal center of said spout whereby to cause the delivery end of said spout to drop into said operative position under the action of gravity.

5. The structure defined in claim 4 in further combination with an adjustable abutment carried by said ring and engageable with the opposite end of said spout whereby to adjust the angle of delivery of said spout with respect to the axis of said ring.

References Cited by the Examiner
UNITED STATES PATENTS

| | | | |
|---|---|---|---|
| 2,808,295 | 10/1957 | Caron | 302—60 |
| 3,158,407 | 11/1964 | Cymara | 302—60 |
| 3,175,668 | 3/1965 | Stoltzfus | 193—3 |
| 3,206,044 | 9/1965 | Schwichtenberg | 214—17.64 |

EVON C. BLUNK, *Primary Examiner.*

ANDRES H. NIELSEN, *Examiner.*